United States Patent
Iwayama et al.

[11] Patent Number: 5,936,601
[45] Date of Patent: Aug. 10, 1999

[54] CHEVRON-TYPE LIQUID CRYSTAL DEVICE HAVING EFFECTIVE DISPLAY AND PATTERN DISPLAY REGIONS

[75] Inventors: Mitsuo Iwayama, Odawara; Akira Tsuboyama, Atsugi, both of Japan

[73] Assignee: Canon Kabushiki Kaisha, Tokyo, Japan

[21] Appl. No.: 08/441,657

[22] Filed: May 15, 1995

Related U.S. Application Data

[63] Continuation of application No. 08/101,958, Aug. 4, 1993, abandoned, which is a continuation of application No. 07/918,077, Jul. 24, 1992, abandoned.

[30] Foreign Application Priority Data

Jul. 25, 1991 [JP] Japan ................................ 3-207271

[51] Int. Cl.$^6$ .................................................. G09G 3/36
[52] U.S. Cl. .................................. 345/97; 345/94; 345/99
[58] Field of Search ................................ 359/54, 75, 76, 359/83, 100

[56] References Cited

U.S. PATENT DOCUMENTS

| | | | |
|---|---|---|---|
| 4,652,872 | 3/1987 | Fujita | 345/78 |
| 4,932,758 | 6/1990 | Hanyu et al. | |
| 5,016,989 | 5/1991 | Okada | 359/75 |
| 5,029,987 | 7/1991 | Shinomiya | 359/75 |
| 5,041,821 | 8/1991 | Onitsuka et al. | 345/94 |
| 5,109,294 | 4/1992 | Hanyu et al. | 359/83 |
| 5,200,848 | 4/1993 | Hanyu et al. | 359/100 |
| 5,223,963 | 6/1993 | Okada et al. | 359/78 |
| 5,267,065 | 11/1993 | Taniguchi et al. | 345/97 |
| 5,323,253 | 6/1994 | Iwayama et al. | 359/56 |
| 5,422,749 | 6/1995 | Hanyu et al. | 359/76 |
| 5,426,525 | 6/1995 | Hanyu et al. | 359/76 |

FOREIGN PATENT DOCUMENTS

| | | |
|---|---|---|
| 0223309 | 5/1987 | European Pat. Off. . |
| 0307959 | 3/1989 | European Pat. Off. . |
| 0350934 | 1/1990 | European Pat. Off. . |
| 0355693 | 2/1990 | European Pat. Off. . |
| 0123017 | 5/1988 | Japan ............................ 359/77 |
| 123017 | 5/1988 | Japan . |
| 124027 | 5/1988 | Japan . |
| 125117 | 5/1991 | Japan . |
| 147216 | 5/1992 | Japan . |

*Primary Examiner*—Richard A. Hjerpe
*Assistant Examiner*—Kent Chang
*Attorney, Agent, or Firm*—Fitzpatrick, Cella, Harper & Scinto

[57] ABSTRACT

A liquid crystal display panel includes a pair of substrates having thereon scanning electrodes and data electrodes so as to form an electrode matrix, and a chiral smectic liquid crystal disposed between the scanning electrodes and data electrodes to form a plurality of smectic layers each including a plurality of liquid crystal molecules. The scanning electrodes and data electrodes are driven to define an effective display region and a frame-like fixed or semi-fixed pattern display region disposed outside the effective display region and extending along at least one side of the display panel. The smectic layers of the chiral smectic liquid crystal are aligned to extend in a direction which is non-parallel with the extension of the frame-like fixed or semi-fixed pattern display region so as to obviate the occurrence of cell thickness irregularity and liquid crystal voids.

12 Claims, 6 Drawing Sheets

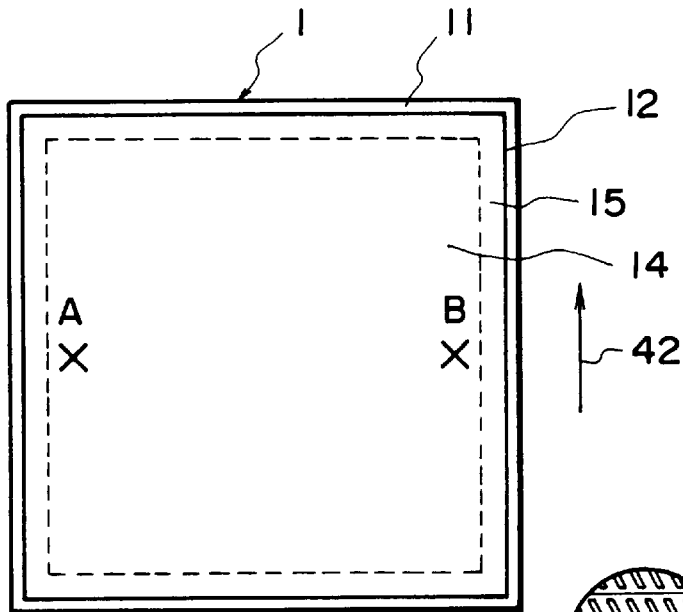
FIG. 4A
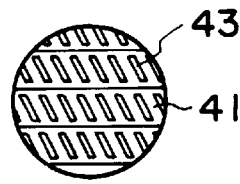
FIG. 4C
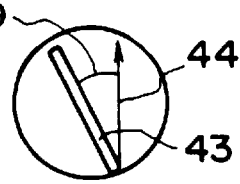
FIG. 4D
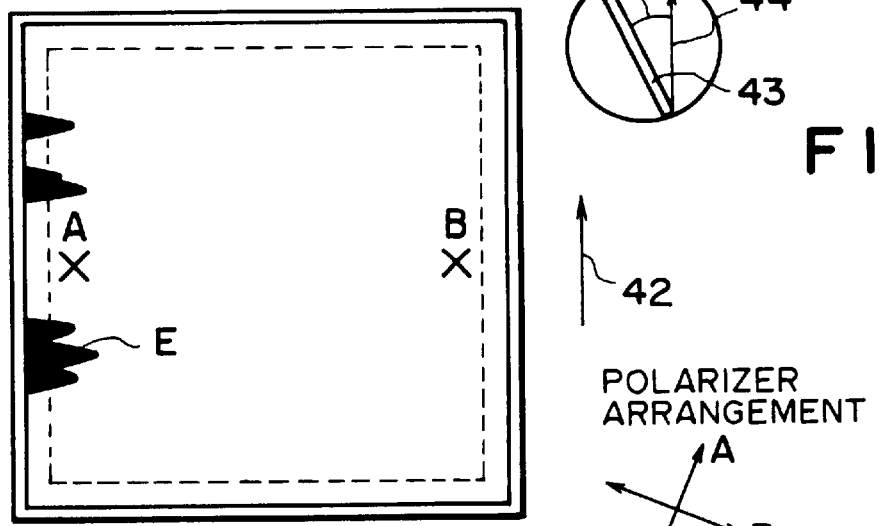
FIG. 4B
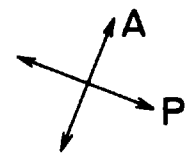

CHEVRON-TYPE LIQUID CRYSTAL DEVICE HAVING EFFECTIVE DISPLAY AND PATTERN DISPLAY REGIONS

This application is a continuation of application Ser. No. 08/101,958, filed Aug. 4, 1993, now abandoned, which is a continuation of application Ser. No. 07/918,007, filed Jul. 24, 1992, now abandoned.

FIELD OF THE INVENTION AND RELATED ART

The present invention relates to a liquid crystal device for use in a liquid crystal display device, a liquid crystal shutter, etc., and more particularly to a ferroelectric liquid crystal device having improved durability.

There has been known a liquid crystal device using a ferroelectric liquid crystal (hereinafter sometimes abbreviated as "FLC") which includes a cell structure formed by disposing a pair of glass plates each provided with transparent electrodes and an aligning treatment on their inner sides opposite to each other with a cell gap on the order of 1 to 3 $\mu$m, and a ferroelectric liquid crystal filling the cell gap, as disclosed in U.S. Pat. No. 4,932,758.

Such a ferroelectric liquid crystal device is characterized in that the ferroelectric liquid crystal has a spontaneous polarization so that a coupling force of an external electric field and the spontaneous polarization can be utilized for switching and that the longitudinal axis direction of an FLC molecule corresponds one-to-one to the polarization direction of the spontaneous polarization so that the switching is effected depending on the polarity of the external electric field.

A ferroelectric liquid crystal generally comprises a chiral smectic liquid crystal in SmC* or SmH* phase so that the longitudinal liquid crystal molecular axis is helically aligned but, if the liquid crystal is disposed in a cell structure having a cell gap on the order of 1–3 $\mu$m as described above, the helix of the longitudinal liquid crystal molecular axis is released.

In an actual drive of such a ferroelectric liquid crystal cell, a simple electrode matrix as shown in FIG. 2 has been used. It has been found that such a ferroelectric liquid crystal cell involves a problem regarding durability as will be described hereinbelow.

It has been known that a liquid crystal molecule moves or fluctuates to some extent along a helical cone inherent to a chiral smectic liquid crystal in response to even a non-selection or non-writing signal during matrix drive. This is clear from an optical response of a pixel receiving a non-selection signal including a change in light quantity synchronized with applied pulses. In an FLC display device using a splay alignment state (i.e., an alignment state wherein longitudinal molecular axes causes a large angular twist between a pair of substrates), such a molecular fluctuation is not so problematic except for a slight decrease in contrast, as the display state can be maintained if the stable position is not changed (i.e., not switched).

In a ferroelectric liquid crystal cell utilizing a uniform alignment state accompanied with little angular twist of longitudinal molecular axes between the substrates as shown in U.S. Pat. No. 4,932,758, etc., however, there has been found a phenomenon that liquid crystal molecules move translationally along the liquid crystal layer extension in response to applied voltages (e.g., non-selection signals). A remarkable example of the phenomenon is explained with reference to FIGS. 4A–4D, wherein FIG. 4A illustrates a state before voltage application and FIG. 4B illustrates a state after voltage application, respectively, of a liquid crystal device 1. The liquid crystal device 1 includes a pair of substrates 11 provided with polyimide films subjected to rubbing as an aligning treatment in upward parallel directions commonly represented by an arrow 42. As a result of the treatment, smectic layers 41 are formed in a direction perpendicular to the rubbing direction 42 (FIG. 4C). More specifically, referring to FIGS. 4A–4D, the device 1 includes a sealing member 12 enclosing a display region 14 and a marginal frame display region 15 outside the display region 14, which frame display region 15 is driven to always display a black or white state (corresponding to a stable +θ or −θ state of the liquid crystal).

When the cell thickness is made sufficiently thin, each liquid crystal molecule can assume two stable states. Now, it is assumed that all the molecules within the cell are caused to uniformly assume one of the two stable states, which is represented by angle +θ with respect to a normal 44 to the smectic layers 41 as shown in FIG. 4D. The other stable state is represented by an almost symmetrical angle −θ with respect to the smectic layer normal 44. When the liquid crystal molecules in the state of +θ are supplied with an electric field (of, e.g., rectangular pulses of ±8 volts at 10 Hz) applied to the entire area of the device for a long period, the liquid crystal molecules begin to move in a direction of from a point A to a point B shown in FIG. 4A. As a result of continuous application of the voltage for a long period, the device causes a local change in cell thickness to finally result in parts E void of liquid crystal along a side near the point A and the thickness at the point B becomes larger than the point A.

On the other hand, in case where the liquid crystal molecules are uniformly placed in the state of −θ, the above-mentioned phenomenon appears in such a manner that the liquid crystal molecules move translationally from the side B to the side A to results in liquid crystal voids on the side B.

As a result of further experiments of ours, the above-mentioned cell thickness change due to movement of liquid crystal molecules occurs in remarkably different degrees depending on the molecular state (+θ or −θ) of the liquid crystal relative to the smectic layer normal, the geometrical length of one molecular state region of the liquid crystal concerned, and the length of the electric field application time.

This is explained in more detail with reference to FIGS. 5A–5D, wherein FIG. 5A illustrates a state before voltage application and FIG. 5B illustrates a state after voltage application. Referring to FIG. 5A, in an experiment, stripe regions L (where liquid crystal molecules 43 were uniformly placed in the state of +θ with respect to the smectic layer normal as shown in FIG. 5C) and R (where liquid crystal molecules 43 were uniformly placed in the state of −θ as shown in FIG. 5D) were formed at certain intervals. With lapse of time, the cell thickness increased along the side B in the frame display region 15 and, on further continuation, liquid crystal voids E occurred only at parts in the frame display region 15 along the side A. This means that the cell thickness change due to liquid crystal molecular movement occurs in case where a region containing one molecular state is continuously present in a large length in the direction of smectic layer extension.

Similar results as shown in FIG. 5B were obtained also in another experiment wherein the liquid crystal molecules only in the display region 14 and except for the frame display region 15 were alternately placed in the states of +θ and −θ at certain time intervals. Also from this result, it is understood that the cell thickness change occurred only in case where the liquid crystal molecules were uniformly placed in one state for a long period of time.

The occurrence of such electrooptically uncontrollable portions (e.g., parts E) is of course undesirable in respects of display quality, and also the cell thickness change with time leads to a difficulty in control of an entire ferroelectric liquid crystal panel. This is particularly problematic with respect to a durability of a fixed pattern display like that of a frame display region driven in only one of the +θ and −θ states and also a semi-fixed pattern like a menu screen of a word processor.

SUMMARY OF THE INVENTION

In view of the above-mentioned problems of the prior art device, an object of the present invention is to provide a chiral smectic liquid crystal display device with a high durability, which is free from occurrence of electro-optically uncontrollable parts, such as liquid crystal voids, for a long period of time even in a region of a fixed pattern or a semi-fixed pattern display.

According to the present invention, there is provided a liquid crystal display apparatus, comprising: a display panel including a pair of substrates having thereon scanning electrodes and data electrodes so as to form an electrode matrix, and a chiral smectic liquid crystal disposed between the scanning electrodes and data electrodes to form a plurality of smectic layers each comprising a plurality of liquid crystal molecules; the scanning electrodes and data electrodes being driven to define an effective display region and a frame-like fixed or semi-fixed pattern display region disposed outside the effective display region and extending along at least one side of the display panel, the smectic layers of the chiral smectic liquid crystal being aligned to extend in a direction which is non-parallel with the extension of the frame-like fixed or semi-fixed pattern display region.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A–4D are illustrations of liquid crystal molecular movement.

DESCRIPTION OF THE PREFERRED EMBODIMENTS

Figure 1:
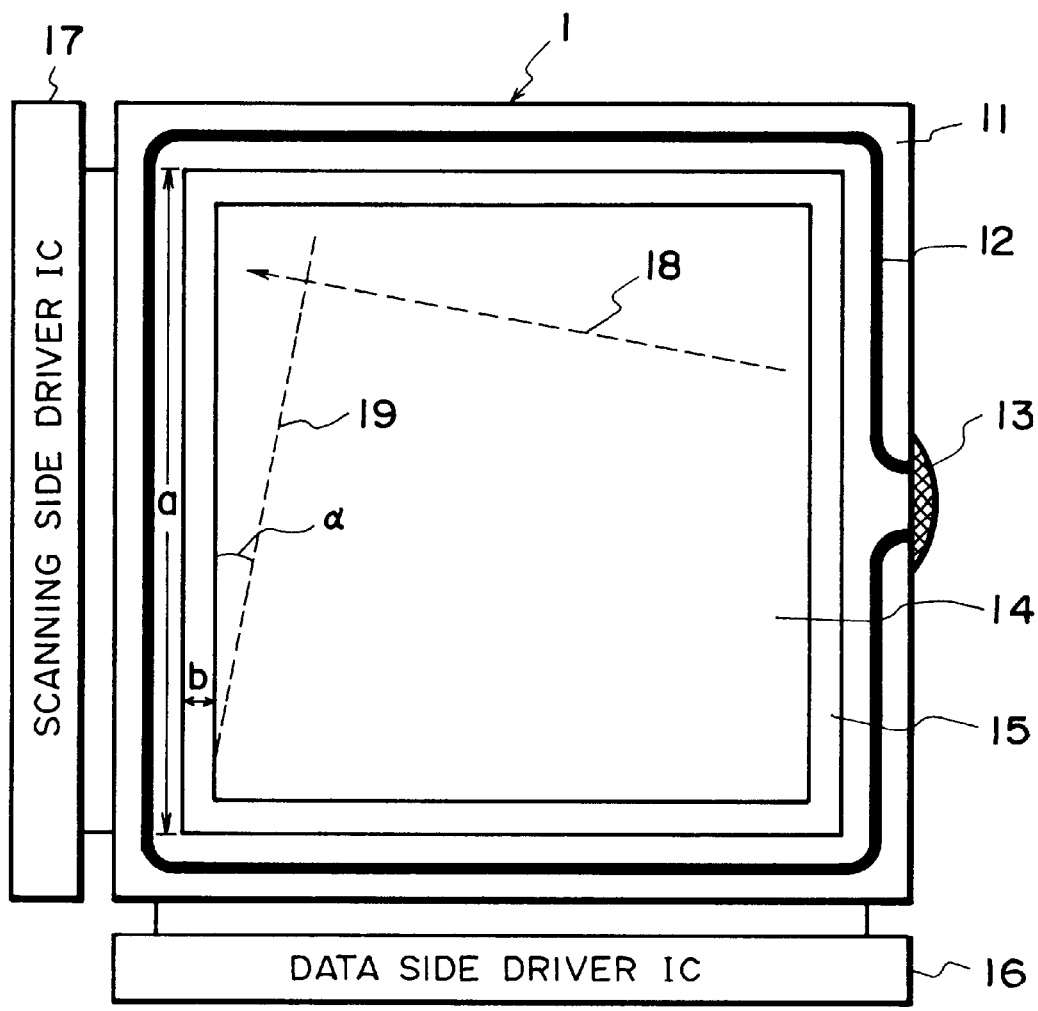
FIG. 1 is a planar front view of a chiral smectic liquid crystal display device according to an embodiment of the present invention.
Figure 6:
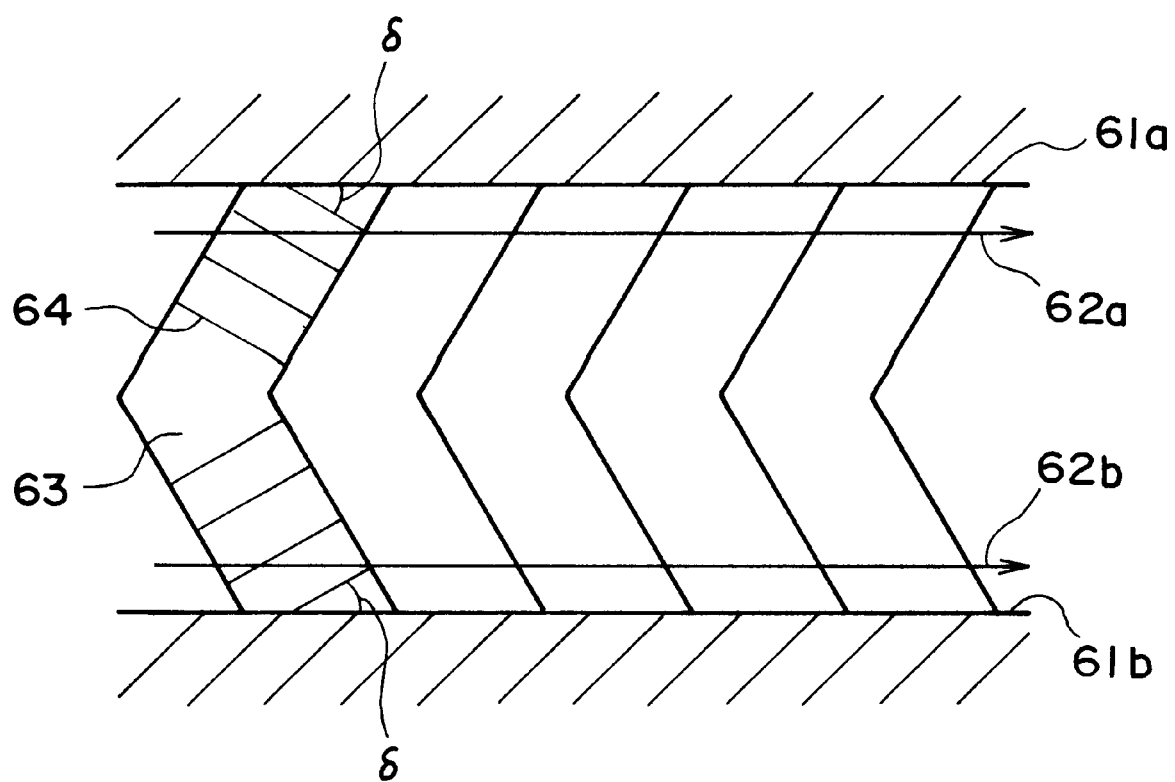
FIG. 6 is a sectional view of a liquid crystal device for illustrating alignment of chiral smectic liquid crystal molecules.

FIG. 1 is a planar front view of a chiral smectic liquid crystal device according to an embodiment of the present invention. Referring to FIG. 1, the device includes a pair of substrates (glass plates) 11 each coated with transparent electrodes of, e.g., $In_2O_3$ or ITO (indium tin oxide), and an alignment film, etc., and a ferroelectric chiral smectic liquid crystal disposed between the substrates. The substrates 11 are applied to each other with a sealing agent or adhesive 12 to form a cell structure filled with the ferroelectric liquid crystal through an injection port which is sealed up with a sealing agent 13. The electrodes formed on the pair of substrates are arranged to form a simple electrode matrix as shown in a somewhat simplified from in FIG. 2 including scanning electrodes $S_1$–$S_4$ in an effective display area and data electrodes $I_1$–$I_4$ in an effectively display area which in combination define a display region 14 as shown in FIG. 1, and also scanning electrodes $F_{S1}$ and $F_{S2}$ for frame display and data electrodes $F_{I1}$ and $F_{I2}$ for frame display which in combination define a frame display region 15 as shown in FIG. 1. The scanning electrodes and data electrodes on the substrates are respectively connected to an electric circuit-printed board carrying a scanning side driver IC 16 and a data side driver IC 17. As shown in FIG. 6, the chiral smectic liquid crystal disposed between the pair of substrates 61a and 61b respectively provided with rubbing axes 62a and 62b in substantially identical directions commonly represented by a direction 18 in FIG. 1, is aligned to form a plurality of smectic liquid crystal molecular layers 63 each constituted by a plurality of liquid crystal molecules 64. The liquid crystal molecular layers (64 in FIG. 6) are formed to extend in a direction 19 perpendicular to the rubbing axis or direction 18 as shown in FIG. 1. As described, the rubbing axes are provided in substantially identical directions but can cross each other so as to form a intersection angle of about 2 degrees to about 15 degrees. In the present invention, the liquid crystal molecular layers are formed in the direction 19 which forms a certain angle α with respect to an extension of a frame display region 15 extending along a side of the panel.

More specifically, in the present invention, the substrates each having thereon electrodes and an alignment film thereon are subjected to an aligning treatment so that the resultant smectic layers do not extend in a direction parallel to a longitudinal direction of a fixed or semifixed pattern which is always or frequently displayed. The aligning treatment may be rubbing or oblique vapor deposition. The aligning treatment may preferably be effected so that the resultant pretilt angles δ, i.e., the angles formed by liquid crystal molecules in the vicinity of the substrates with respect to the associated substrates 61a and 61b, are formed in substantially identical directions as shown in FIG. 6. The liquid crystal may be in a uniform alignment state.

In case where the fixed or semi-fixed pattern display region has a length a and a width b as shown in FIG. 1, the direction of smectic layer extension may preferably be deviated at an angle α satisfying $\tan \alpha \geq b/a$.

Thus, according to the present invention, an aligning treatment is effected so that a smectic layer passing one longitudinal end of a fixed or semifixed pattern display region is not allowed to extend to pass also the other longitudinal end of the fixed or semifixed pattern display region, thereby improving the durability of the liquid crystal device. For example, if the smectic layer is disposed in a direction forming an angle of at least 3 degrees, preferably 5–50 degrees, with respect to the longitudinal extension of a fixed or semifixed pattern display region, a practically sufficient durability may be obtained.

Figure 2:
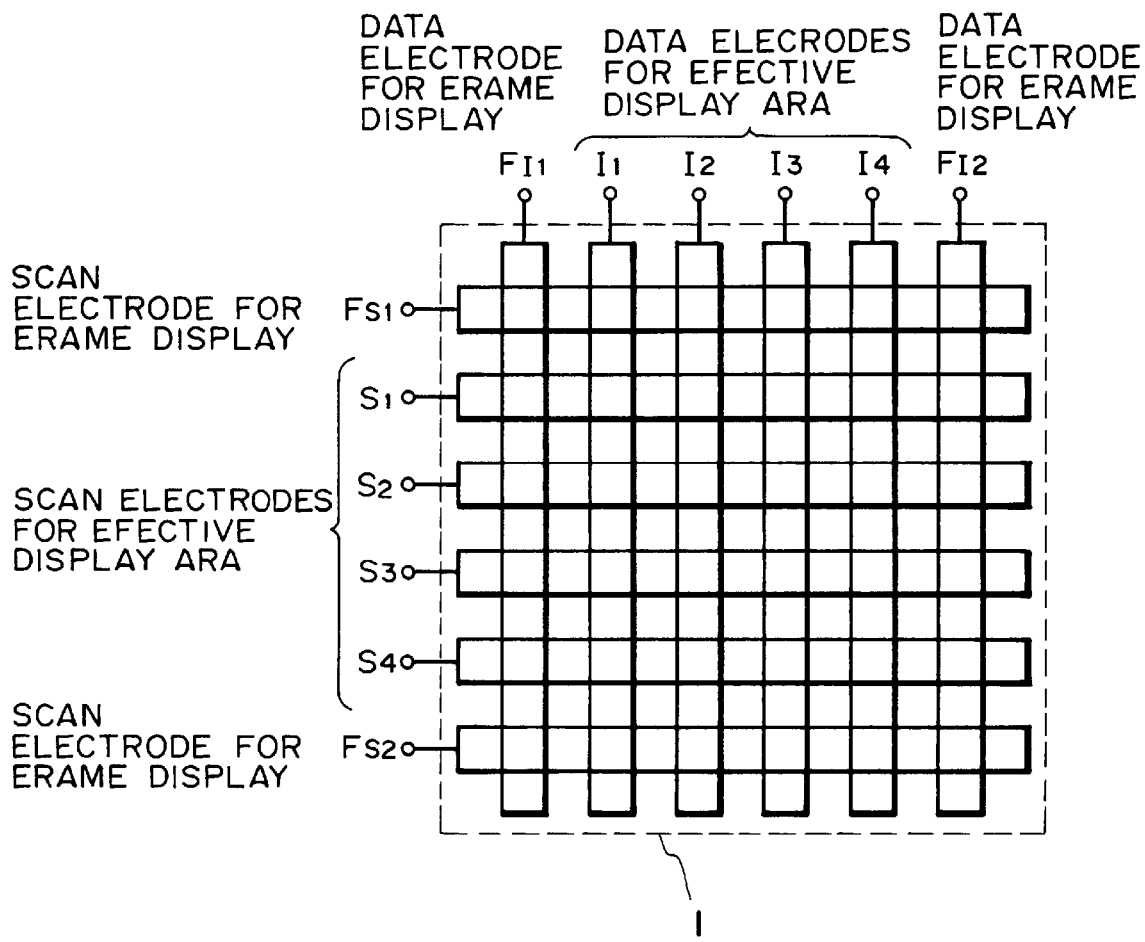
FIG. 2 is an illustration of an electrode matrix used in the liquid crystal display device of FIG. 1.

Referring to FIG. 2 showing a simple electrode matrix in a somewhat simplified form, scanning electrodes $F_{S1}$ and $F_{S2}$ for frame display are disposed outside scanning electrodes, $S_1$, $S_2$, $S_3$ and $S_4$ for defining an effective display area. The scanning electrodes $S_1$–$S_4$ are supplied with voltage waveforms (scanning signals) as shown at $S_1$, $S_2$, $S_3$ . . . in FIG. 3 including a scanning selection signal (having a length of 2H (=4Δt)) and a scanning nonselection signal. The scanning electrodes $F_{S1}$ and $F_{S2}$ are also supplied with a scanning selection signal similar to those shown at $S_1$, $S_2$ . . . in FIG. 3, at a frequency of, e.g., once per 60 times of supplying a scanning selection signal to the scanning electrodes $S_1$–$S_4$ (actually 1042 lines in a specific example). On the other hand, data electrodes $I_1$–$I_4$ (actually 1124 lines in a specific example) constituting the reflective display region may be supplied with data signals representatively shown at $I_1$, $I_2$, . . . in FIG. 3 corresponding to a desired display pattern. In synchronism with the application of the scanning selection signal to the scanning electrode $F_{S1}$ or $F_{S2}$, data signals giving either a "white" or "black" display state are simultaneously supplied. Further, to the data electrodes $F_{I1}$ and $F_{I2}$ for frame display disposed outside the data electrodes $I_1$, . . . $I_4$, data signals giving either a "white" or "black" display state ("black" state in the case of FIG. 3) when synchronized with the scanning selection signal are continually supplied.

As a result, a fixed or semifixed display pattern for frame display (in a "black" state in the case of FIG. 3) may be formed.

Hereinbelow, specific examples of durability evaluation will be described.

EXAMPLE 1

A ferroelectric liquid crystal display device (panel) as explained with reference to FIG. 1 was prepared while applying a rubbing treatment to the substrates so that the smectic layer extended at an angle α of 0.5 degree with respect to the longitudinal direction of the frame display region. The device was then subjected to a durability test wherein a set of driving signals as described above with reference to FIG. 3 ($|V_1|=|V_2|=10$ volts, $|V_3|=|V_4|=5$ volts, 1H=300 μsec) were applied to the respective electrodes (1042 scanning electrodes and 1124 data electrodes) continuously to observe the occurrence of a change in cell thickness or liquid crystal voids along the panel.

The liquid crystal material used was an ester-pyrimidine type mixture liquid crystal showing the following phase transition temperature (°C.):

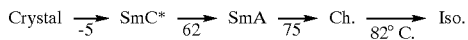

The liquid crystal also showed a spontaneous polarization of 5.8 nC/cm² at 25° C., and the resultant liquid crystal panel showed a response speed (causing a transmittance change of 10–90% at 30 volts) of 110 μsec.

As a result, no change in cell thickness or no occurrence of liquid crystal void was observed over the extension of the panel in the durability test of 1000 hours. Thus, the panel was evaluated as a display device of practically no problem.

EXAMPLES 2–6

Five liquid crystal devices (panels) were prepared and evaluated in the same manner as in Example 1 except that the angle α was changed to 3 degrees, 10 degrees, 20 degrees, 30 degrees and 45 degrees, respectively. The results are shown in Table 1 appearing hereinafter together with Example 1.

In any case, results of practically no problem were obtained.

Comparative Example 1

A liquid crystal device was prepared and evaluated in the same manner as in Example 1 except that the angle α shown in FIG. 1 was changed to 0 degree, i.e., the rubbing was applied to the substrates so that the smectic layer extension direction coincided with the longitudinal direction of the frame display region.

As a result, a cell thickness change ($\geq 0.1$ μm) and liquid crystal voids occurred in the frame region as shown in FIG. 5 within 500 hours from the start of the durability test. The results are shown in Table 1 together with the results of Examples 1–6.

TABLE 1

|  | α (degrees) | Cell thickness change | Liquid crystal void |
|---|---|---|---|
| Example 1 | 5 | None | Not occurred |
| Example 2 | 3 | None | within 1000 hours |
| Example 3 | 10 | None |  |
| Example 4 | 20 | None |  |
| Example 5 | 30 | None |  |
| Example 6 | 45 | None |  |
| Comp. Example 1 | 0 | Occurred after 280 hours in frame region | Occurred after 360 hours in frame region |

As is shown in the above Table 1, it is known that the durability of a ferroelectric liquid crystal device can be improved to a level of practically no problem if the angle α is set to at least 3 degrees, preferably 5 degrees–50 degrees.

As has been described above, according to the present invention, the durability of a ferroelectric liquid crystal device can be improved by applying an aligning treatment so that the resultant smectic layer extension is not in parallel with the longitudinal direction of a fixed or semifixed display pattern region.

What is claimed is:

1. A liquid crystal display apparatus, comprising:

a display panel including a pair of substrates having thereon scanning electrodes and data electrodes so as to form an electrode matrix, a chiral smectic liquid crystal disposed between the scanning electrodes and data electrodes to form a plurality of smectic layers each comprising a plurality of liquid crystal molecules, said smectic layers being inclined with respect to both substrates and bent between the substrates, and drive means for applying (i) a scanning signal to the scanning electrodes in an effective display region in synchronism with data signals to the data electrodes in the effective display region and (ii) in a prescribed period a scanning-side drive pulse having a waveform identical to that of the scanning signal to the scanning electrodes outside the effective display region in synchronism with data-side drive pulses for providing a frame-like fixed or semi-fixed pattern to the data electrodes outside the effective display region; said scanning signal including a scanning selection signal and a scanning non-selection signal, said scanning selection signal comprising a first voltage of one polarity and a second voltage of the other polarity immediately subsequent to the first voltage, the first voltages of two successive scanning selection signals partially overlapping with each other in time;

wherein said pattern display region extends along at least one side of the display panel, said smectic layers of the chiral smectic liquid crystal being aligned to extend in a direction which is non-parallel with the extension of the pattern display region.

2. An apparatus according to claim 1, wherein said smectic layers are aligned to extend in a direction at an angle α of at least 3 degrees with respect to the extension of the frame-like fixed or semi-fixed pattern display region.

3. An apparatus according to claim 2, wherein the angle α is set within the range of 5 degrees to 50 degrees.

4. An apparatus according to claim 1, wherein said liquid crystal molecules within the smectic layers form a pre-tilt angle in the vicinity of the substrates.

5. An apparatus according to claim 1, wherein a scanning electrode driven to form the fixed or semi-fixed pattern display region is supplied with a scanning signal which is identical in waveform to a scanning selection signal applied to the scanning electrodes for defining the effective display region.

6. An apparatus according to claim 1, wherein a data electrode driven to form the fixed or semi-fixed pattern display region is continually supplied with a display signal providing one display state to pixels associated with said data electrode.

7. An apparatus according to claim 1, wherein said substrates have been treated by rubbing for aligning the chiral smectic liquid crystal.

8. An apparatus according to claim 1, wherein said substrates have been treated by oblique vapor deposition for aligning the chiral smectic liquid crystal.

9. An apparatus according to claim 1, wherein said scanning selection signal further comprises a voltage of said one polarity after said voltage of the other polarity.

10. An apparatus according to claim 1, wherein the voltage of said other polarity of the first of said two successive scanning selection signals overlaps in time with the voltage of said one polarity of the second of said two successive scanning selection signals.

11. An apparatus according to claim 1, wherein said scanning non-selection signal has a voltage of zero.

12. An apparatus according to claim 1, wherein said chiral smectic liquid crystal has a property of moving in a direction of its smectic layer under application of an electric field.

* * * * *

UNITED STATES PATENT AND TRADEMARK OFFICE
CERTIFICATE OF CORRECTION

PATENT NO.   : 5,936,601
DATED        : August 10, 1999
INVENTOR(S)  : MITSUO IWAYAMA ET AL.

It is certified that error appears in the above-identified patent and that said Letters Patent is hereby corrected as shown below:

ON THE TITLE PAGE [56] References Cited

FOREIGN PATENT DOCUMENTS, "123017 5/1988 Japan." should be deleted.

In the Drawings:

SHEET 2

Figure 2, "ERAME" should read --FRAME-- (all occurrences); "ARA" should read --AREA-- (both occurrences); and "EFECTIVE" should read --EFFECTIVE-- (both occurrences).

SHEET 3

Figure 3:
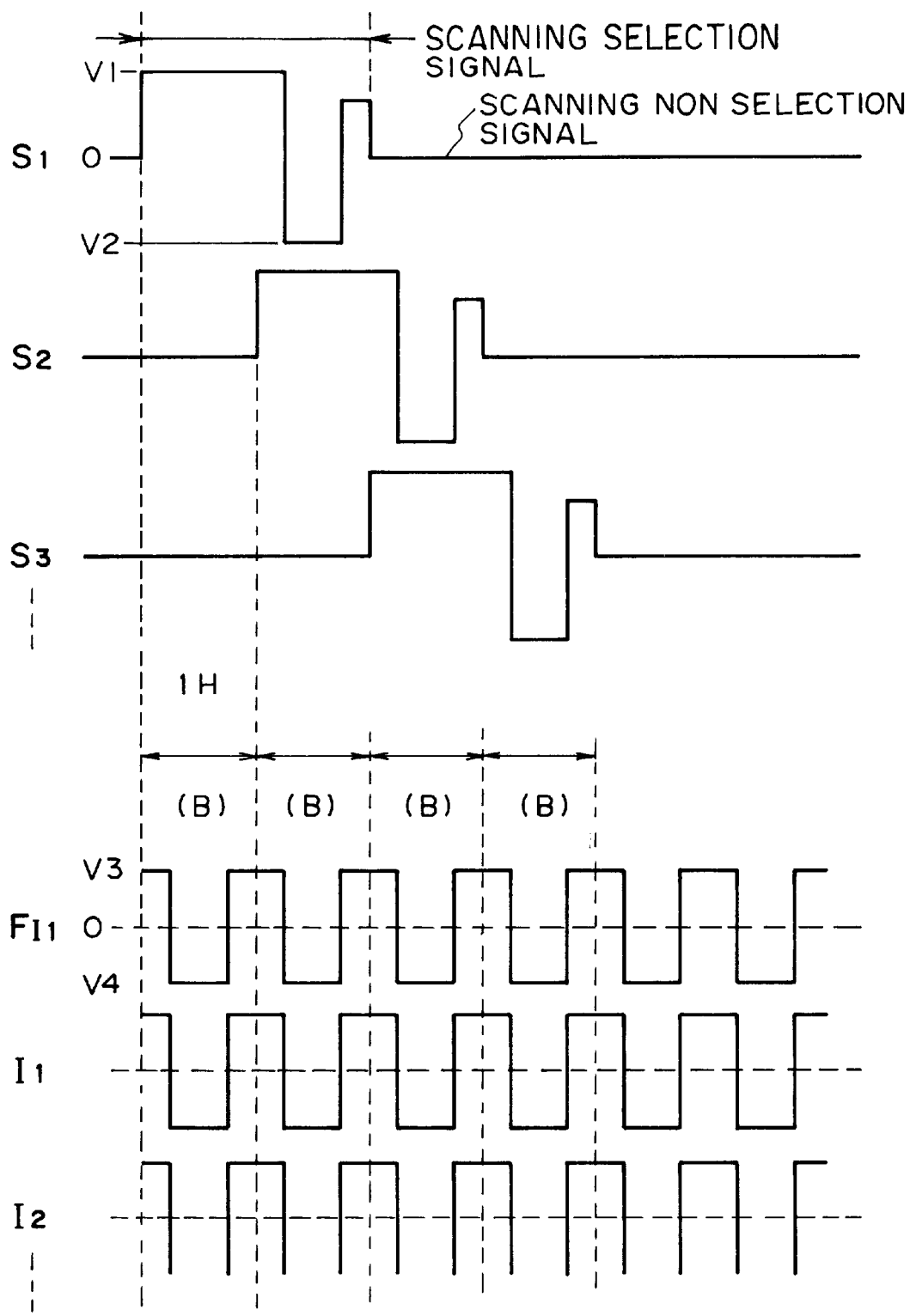
FIG. 3 is a diagram showing a set of driving voltage waveforms used in an operation example of the device of FIG. 1.
Figure 5A:
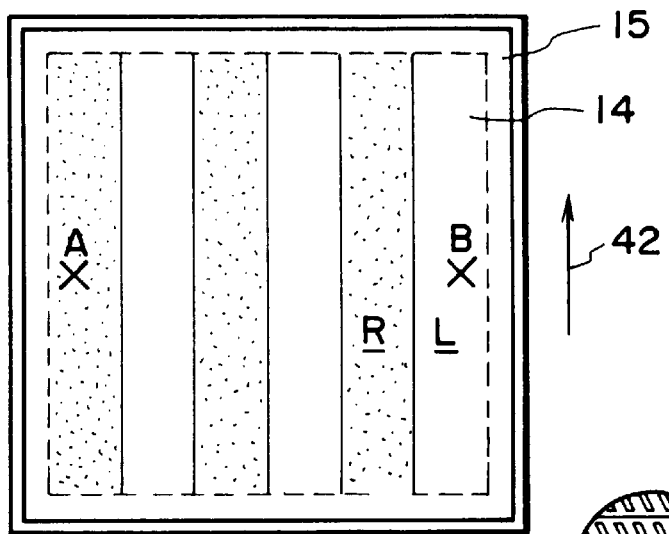
FIGS. 5A–5D are illustrations of liquid crystal molecular movement similar to FIGS. 4A–4D.
Figure 5C:
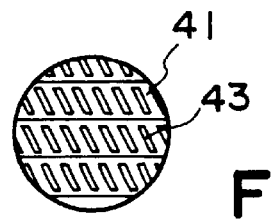
Figure 5D:
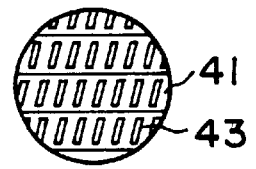
Figure 5B:
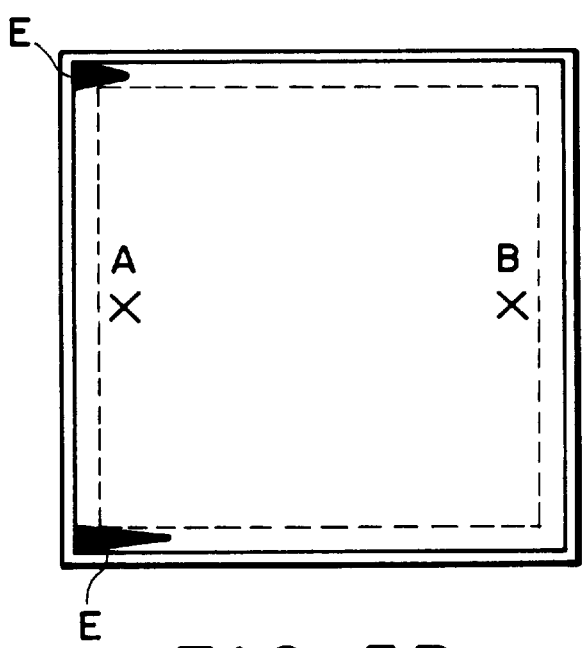

Figure 3, "NON SELECTION" should read --NON-SELECTION--.

COLUMN 2

Line 37, "results" should read --result--.

UNITED STATES PATENT AND TRADEMARK OFFICE
CERTIFICATE OF CORRECTION

PATENT NO.    : 5,936,601
DATED         : August 10, 1999
INVENTOR(S)   : MITSUO IWAYAMA ET AL.

It is certified that error appears in the above-identified patent and that said Letters Patent is hereby corrected as shown below:

COLUMN 4

Line 10, "from" should read --form--;
Line 12, "effectively" should read --effective--; and
Line 31, "a" should read --an--.

Signed and Sealed this

Twenty-third Day of May, 2000

Attest:

Q. TODD DICKINSON

Attesting Officer          Director of Patents and Trademarks